N. WASHBURN.
CAR WHEEL AND AXLE.
No. 191,293. Patented May 29, 1877.
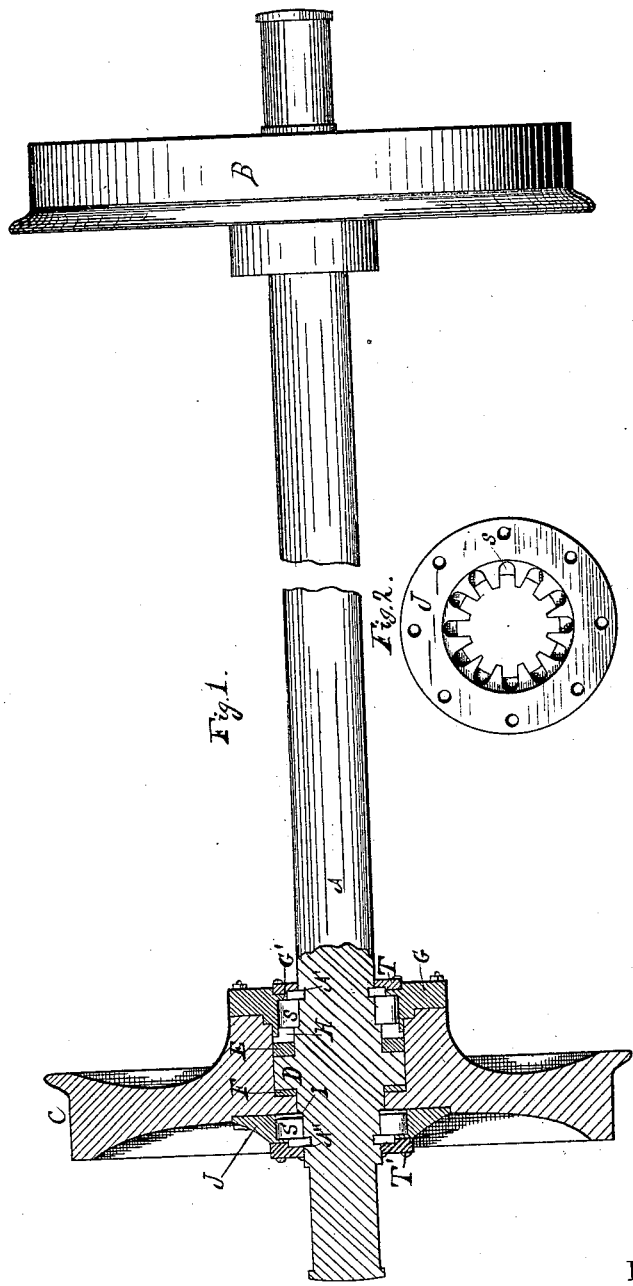

UNITED STATES PATENT OFFICE.

NATHAN WASHBURN, OF HARTFORD, CONNECTICUT.

IMPROVEMENT IN CAR WHEELS AND AXLES.

Specification forming part of Letters Patent No. 191,293, dated May 29, 1877; application filed December 14, 1876.

*To all whom it may concern:*

Be it known that I, NATHAN WASHBURN, of Hartford, in the county of Hartford and State of Connecticut, have invented certain new and useful Improvements pertaining to Car Wheels and Axles, of which the following is a specification, reference being had to the accompanying drawings, where—

Figure 1 is a view of an axle with two wheels attached after the manner of my invention, a part of the axle and one (the loose) wheel being in central axial section. Fig. 2 is a detail view of the interior face of one of the cap-flanges.

The invention is an improvement in that class of wheels and axles designed to permit the wheels to move at different velocities in traveling around curves.

The letter A denotes the axle, made in one rigid piece from end to end, near one end of which the wheel B is rigidly attached. Wheel C is loose thereon.

The circular collar or flange D is fast on the axle. Next this collar, and abutting against its sides, are the loose friction-collars E F. These three collars are of the same diameter, all circular in shape, and lie in a closely-fitting circular cup made in the hub of wheel C. They are confined or kept to place by the cap-flange G, screwed to the inner side of wheel C. Between loose collar F and cap-flange G is a packing-chamber, H, filled with suitable packing material to exclude dust and retain the lubricant. This retention of lubricant and exclusion of dust is a most essential matter, and has been carefully provided for by me.

In the interior of cap-flange G are formed radial packing-chambers S, to be filled with some solidly-compressed packing, as oakum. These radial chambers are prevented from opening with their full size to the outside of the cap-flange by the flange G', formed on the cap-flange.

The radial packing-chambers S are made as chambers that the oakum or other packing that they contain may be driven solidly into place with a mallet and hand-bar.

In the axle, and extending outward between the cap-flange G and the plate T, which is screwed to the outer side of cap-flange G, is the annular packing-groove A', designed to be filled with packing, such as rubber or leather.

On the outer side of wheel C is a cap-flange, J, similar to cap-flange G, having packing-chamber similar to chamber H underneath, having the radial packing-chambers S and a similar covering-plate, T', covering a similar annular packing-groove, A''.

I claim as my invention—

1. The cap-flange G, provided with the radial packing-chambers.

2. In combination, axle A, provided with groove A', wheel C, cap-flange G, and plate T.

3. In combination, axle A, provided with grooves A' A'' and fixed flange D, wheel C, having cup in the hub to receive flange D, loose collars E F, cap-flanges G J, and plates T T'.

NATHAN WASHBURN.

Witnesses:
W. E. SIMONDS,
ROBT. F. GAYLORD.